US010764055B1

(12) United States Patent
Edwards et al.

(10) Patent No.: US 10,764,055 B1
(45) Date of Patent: Sep. 1, 2020

(54) CLUSTER-BASED SECURITY FOR NETWORK DEVICES

(71) Applicant: Capital One Services, LLC, McLean, VA (US)

(72) Inventors: Joshua Edwards, McLean, VA (US); Michael Mossoba, McLean, VA (US); Abdelkader Benkreira, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/729,791

(22) Filed: Dec. 30, 2019

(51) Int. Cl.
H04L 9/32 (2006.01)
H04L 9/08 (2006.01)
G07F 19/00 (2006.01)

(52) U.S. Cl.
CPC .......... H04L 9/3231 (2013.01); H04L 9/0819 (2013.01); H04L 9/0866 (2013.01); H04L 9/3228 (2013.01); G07F 19/211 (2013.01)

(58) Field of Classification Search
CPC ... G06Q 20/40; G06K 9/00067; G07F 19/211
USPC ........................................................ 713/186
See application file for complete search history.

(56) References Cited

U.S. PATENT DOCUMENTS

| 5,712,912 | A | * | 1/1998 | Tomko | G06K 9/00067 713/186 |
| 8,783,566 | B1 | * | 7/2014 | Drew | G06Q 50/22 235/375 |
| 2007/0143225 | A1 | * | 6/2007 | Hamilton | G06Q 20/382 705/64 |
| 2007/0219926 | A1 | * | 9/2007 | Korn | G07F 7/1008 705/67 |
| 2008/0040274 | A1 | * | 2/2008 | Uzo | G06Q 20/40 705/44 |
| 2012/0293642 | A1 | * | 11/2012 | Berini | G06F 21/602 348/77 |
| 2017/0053284 | A1 | * | 2/2017 | Votaw | G06Q 20/3278 |
| 2019/0147418 | A1 | * | 5/2019 | Kuribara | G07F 19/211 705/43 |

* cited by examiner

Primary Examiner — Bryan F Wright
(74) Attorney, Agent, or Firm — Pillsbury Winthrop Shaw Pittman LLP

(57) ABSTRACT

A system may include a first automated teller machine (ATM) and a second ATM, wherein the first ATM and the second ATM are in communication via a local area network. The first ATM obtains a user input value, generate an encryption key based on the user input value, and generates encrypted authentication information based on the encryption key. The first ATM also obtains a first biometric reading, updates a user record based on the first biometric reading, and stores the encrypted authentication information at the first ATM in association with the user record. The second ATM obtains a second biometric reading and a duplicate value, retrieves the encrypted authentication information associated with the user record based on the second biometric reading, generates a decryption key based on the duplicate value, and decrypts the encrypted authentication information to retrieve the authentication information.

16 Claims, 3 Drawing Sheets

# CLUSTER-BASED SECURITY FOR NETWORK DEVICES

FIELD

The invention relates to network architectures and security for supporting authentication that rely on biometric or other identification features.

BACKGROUND

The use of biometric identification or other verification techniques in electronic transactions can reduce the need for physical access cards to access records via an automated teller machine (ATM). However, biometric identification and other verification techniques often increase cybersecurity risks by requiring additional security measures to protect the biometric information or other sensitive information used to identify individuals. Moreover, regardless of the security measures being implemented, storage of this biometric information in a centralized storage makes the centralized storage an increasingly attractive target for hackers. These and other drawbacks exist.

SUMMARY OF THE INVENTION

Aspects of the invention relate to methods, apparatuses, media, and/or systems for facilitating biometric identification for a network of electronic devices.

In some embodiments, a first biometric reading associated with a user during a first session may be obtained via a first kiosk. The local user record may be updated at the first kiosk based on the first biometric reading, where the local user record is associated with encrypted information, and where the local user record is retrievable based on the first biometric reading. A second biometric reading and a user input value may also be obtained during a second session. The local user record may be retrieved based on the second biometric reading without accessing the Internet. A decryption key may be generated based on the user input value. The encrypted information associated with the local user record may be decrypted based on the decryption key generated from the user input value to determine authentication information associated with the user. A remote user record value may be retrieved from a remote server based on the authentication information.

In some embodiments, a system may include a local cluster of network devices that includes a first kiosk and a second kiosk, where each of the network devices are connected via a local area network. The first kiosk may include a first biometric scanner to acquire a first biometric reading and a processor to update a local user record accessed using the first biometric reading. The second kiosk may include a second biometric scanner that receives a second biometric reading, communicate a value based on the second biometric reading to the first kiosk via the local area network, and retrieve the local user record based on the second biometric reading via the local area network. The local cluster may then retrieve a remote user record associated with a value stored in the local user record via the connection to the remote server.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION OF THE INVENTION

Figure 1:
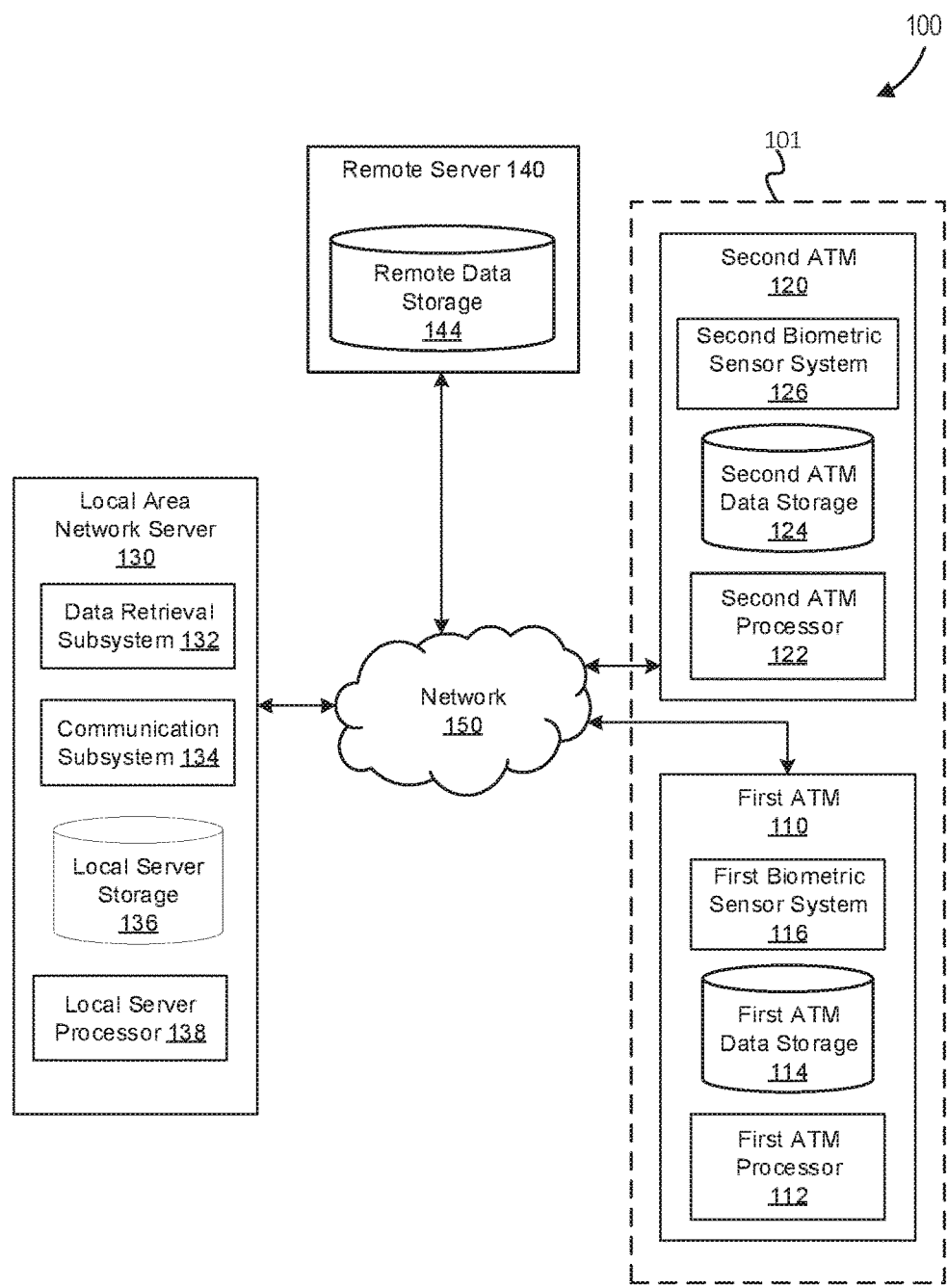
FIG. 1 show a system for storing and retrieving information using a cluster of ATMs or other devices, in accordance with one or more embodiments.

In the following description, for the purposes of explanation, numerous specific details are set forth in order to provide a thorough understanding of the embodiments of the invention. It will be appreciated by those having skill in the art, however, that the embodiments of the invention may be practiced without these specific details or with an equivalent arrangement. In other cases, well-known structures and devices are shown in block diagram form in order to avoid unnecessarily obscuring the embodiments of the invention.
Example Systems FIG. 1 shows a system for storing and retrieving information using a cluster of ATMs or other devices. As illustrated in FIG. 1, a system 100 may include a set of network devices 101, a local area network server 130, a remote server 140, a network 150, or other components. As an example, the set of network devices 101 may include any number of ATMs linked as a local cluster of ATMs in the network 150 and may include the first ATM 110 and the second ATM 120, where a cluster may include two or more of connected network devices. The first ATM 110 may include various components of ATM devices, and may include a first ATM processor 112, first ATM data storage 114, and first biometric sensor system 116. Similarly, the second ATM 120 may include various components such as a second ATM processor 122, second ATM data storage 124, and second biometric sensor system 126.

While not shown, the set of network devices 101 may include additional ATMs or other network devices (in addition to or in lieu of ATMs) that are in communication with the network 150 or electronic components in communication with the network 150. In addition, the network 150 may be in communication with other network devices such as a desktop computer, a notebook computer, a tablet computer, mobile computing device, or other network device, where it should be recognized that the terms used for network device types are not necessarily mutually exclusive.

In some embodiments, a user may use a respective ATM in the set of network devices 101 to retrieve values from a user record associated with the user (e.g. an account record, a personal information record, etc.) that is stored in a remote server 140 by presenting an access object to the respective ATM. An access object may include an access card storing authentication information, where authentication information may be any set of values used to identify a user record, a value associated with the user record, or provide security information required to access the user record. In some embodiments, an access object may include a device having a radio frequency identification (RFID) chip, other devices that have an electronics-readable component storing authentication information, and the like. For example, an access object may be presented to an ATM by inserting a credit card into the ATM or by bringing a mobile computing device having an RFID device (such as a near-field communication chip) into proximity of an RFID sensor of the ATM. Once the access object is presented to the ATM, some embodiments may obtain authentication information from the access object. The ATM may use the authentication information to access data associated with a remote user record stored in the remote server 140, where a user record may be any indexed group of data associated with the user, and where a remote user record is a user record that is stored in a remote server. In some embodiments, an ATM may also require one or more user inputs such as a personal identification number (PIN) in conjunction with the authentication information to enable access to the remote server 140, where the one or more user inputs may also be included as part of the authentication information. For example, after inserting a credit card to the first ATM 110, a user may enter a PIN into the keypad of the ATM in order to access user record information associated with the user.

In some embodiments, a respective ATM in the set of network devices 101 may allow a user to access a user record without presenting an access object to the respective ATM or other network device by instead providing a biometric reading. As discussed further below, once the respective ATM receives the biometric reading, the respective ATM may determine a storage value based on the biometric reading. Alternatively, some embodiments may determine the storage value and an associated user record based on a different input (e.g., a user input value, an access object, or some other object). Furthermore, in some embodiments, data stored in the user record or otherwise associated with the user record may be unencrypted or be otherwise made accessible based on a verification value determined from the biometric reading even if the storage value itself is not determined based on the biometric reading. During a data session in which a user is accessing data via an ATM ("access session"), the respective ATM may then store the authentication information associated with a user in association with a local user record based on the storage value, where a local user record may be any user record that is stored in one of the set of network devices 101 or the local area network server 130 and that is accessible to the set of network devices 101 without accessing the Internet. For example, the storage value may indicate a memory address in a local data storage or an index value of a database in the local data storage, where the local data storage may be any one of a data storage of an electronic device in communication with the network 150 without accessing the Internet. By avoiding the Internet when accessing user-related data, the system may reduce the vulnerability of information stored in the set of network devices 101 to hackers or malicious entities. In one use case, the ATM may store the authentication information at the ATM's data storage in association with a local user record at the ATM's data storage. In another use case, the ATM may store the authentication information at a data storage of another ATM in the same cluster of ATMs in association with a local user record at the other ATM's data storage. In some embodiments, the authentication information may be encrypted based on the biometric reading used to generate the storage value. Alternatively, or in addition, the authentication information may be encrypted with an additional input value such as an additional biometric reading or a user-entered value such as the PIN described above.

The first biometric sensor system 116 and second biometric sensor system 126 may include any number of sensors capable of measuring a portion or all of a human body to acquire biometric readings, such as a camera, laser scanner, infrared scanner, ocular scanner, microphone, and the like. Biometric readings may include facial scans, iris scans, retina scans, fingerprints, palm prints, hand vein images, finger geometries, voice recordings, signature or handwriting images, ear images, full body scans, and the like. Various models of biometric sensors in the first biometric sensor system 116 or the second biometric sensor system 126 may be obtained from different biometric sensor manufacturers and may be combined with a single ATM. For example, the first biometric sensor system 116 may include a fingerprint scanner to acquire a fingerprint, a first camera to acquire a facial scan, a second camera to acquire a scan of an eye, a microphone to acquire a voice recording, and the like. Each of the ATMs may include hardware (e.g., touchscreen device, buttons) and software to receive input from and to display user interfaces to a user.

The biometric reading may be stored in one or more data types. For example, the biometric reading may be stored in the form of a one-dimensional array, a multidimensional array, a string, and the like. The values of a biometric reading may represent various properties or aspects depending on the type of biometric readings being acquired. For example, if an image is being acquired, the biometric reading may include an array of intensity values, color information (e.g. RGB, CMYK, etc.) for a set of pixels of the image. In addition, or alternatively, the biometric reading may include position information for a point-cloud representing a geometry (e.g. a 3D facial scan). In cases where the biometric reading represents auditory recordings such as a voice recording, the biometric reading may be an array of values representing a set of sound amplitudes, set of frequencies, set of waveforms, and the like. Some embodiments may perform down-sampling or smoothing to improve efficiency, accuracy, or consistency when further processing of a biometric reading. For example, some embodiments may increase image consistency by converting the color profile of a sample to a chosen standard color profile.

A device in the set of network devices 101 may interact with the local area network server 130, a remote server 140, or other components of system 100 via a network 150 that may include wired connections or wireless connections. For example, the first ATM 110 and second ATM 120 may be coupled via a network 150, where the first ATM 110 may allow access to authentication information stored in the first ATM data storage 114 from the second ATM 120 or another network device. The local area network server 130 may include a data retrieval subsystem 132 to retrieve data from the local area network server 130, a communication subsystem 134 to communicate with the network 150, and a local server storage 136 to store data such as data acquired from the network 150, or other components.

In some embodiments, devices in the set of network devices 101 may store data such as authentication information in the local server storage 136. Similarly, in some embodiments, devices in the set of network devices 101 may retrieve data such as authentication information stored in the local server storage 136. The local area network server 130 may further include a local server processor 138 to perform operations such as encrypting the authentication information based on an encryption key or decrypt encrypted authentication information based on the encryption key. In some embodiments, the encrypted authentication information may be transmitted from the local server storage 136 to a respective ATM such as the first ATM 110 or the second ATM 120 via the network 150 after being provided with a storage value based on a biometric reading from the respective ATM that obtained the biometric reading.

In some embodiments, some or all of the set of network devices 101 and the local area network server 130 may be used as peer nodes of a decentralized computing platform operative to persist state to a decentralized tamper-evident data store. An example of a decentralized tamper-evident data store may include one or more blockchain-based computing platforms or other decentralized applications, like Swarm, Dat, Interplanetary File System, and the like. Examples of such computing platforms include AxCore, Ethereum, Hyperledger (e.g., Sawtooth, Fabric, or Iroha, or the like), Corda, Openchain, Stellar, NEO, Libra, Bitcoin, and EOS. For example, both the first ATM 110 and the second ATM 120 may operate as peer nodes of a decentralized computing platform. In some embodiments, the decentralized computing platform is a Turing-complete decentralized computing platform operative to execute smart contracts on the computing platform in a decentralized manner with verifiable computing techniques. For instance, computations may be replicated on each of a plurality of (like a randomly or pseudo-randomly selected subset of, or all of) peer nodes of the computing platform, and a consensus may be reached regarding results of the computation, such that a malicious actor is impeded from interfering with results of the computation by peer nodes outside their control. In some embodiments, as further discussed below, a distributed hash table (DHT) may be propagated through peer nodes of a decentralized computing platform, where the DHT may be used to store authentication information or values associated with authentication information (e.g. a pointer to a user record in a database of user records storing the authentication information, a pointer to the authentication information, etc.).

Data storage may store software, such as an operating system or applications. In some embodiments, the data storage for an ATM does not permanently include any transaction data or any biometric readings. For example, in some embodiments, the first ATM data storage 114 does not permanently include any transaction data. In some embodiments, ATM data storage may store transaction data or a biometric reading until such information is transmitted to the local server storage 136 or the remote server 140, or may retain transaction data or the biometric reading after such information is transmitted. For example, the first ATM data storage 114 may store transaction data until such information is transmitted to the local server storage 136, at which point the transaction data is deleted from the first ATM data storage 114.

While one or more operations are described herein as being performed by particular components of the set of network devices 101, those operations may, in some embodiments, be performed by other components of the set of network devices 101 or other components of system 100. As an example, while one or more operations are described herein as being performed by components of the first ATM 110, those operations may, in some embodiments, be performed by components of the second ATM 120. Further, although the remote data storage 144 is illustrated as being within the remote server 140, the remote data storage 144 may be located separately from the remote server 140.

In some embodiments, the remote server 140 may include an application programming interface (API) via which the devices in the set of network devices 101 or the local area network server 130 can issue various requests disclosed herein. The remote server 140 may store user-identifying data such as remote user records, user-identifying transaction data (e.g., name, account number) associated with one or more user records, and the like. In some embodiments, the remote data storage 144 or other database in communication with the remote server 140 may include a relational database having one or more tables to store transaction data, event data, and other information. Some of the stored values may be singular values (e.g., $45, for a withdrawal amount stored in event details), while some may be one or multi-dimensioned arrays (e.g. a multi-dimensional array representing pixel colors of a bank check image).

In some embodiments, the use of biometric information or other low-effort identity confirmation methods may create a cybersecurity risk. Conventional biometric identity confirmation systems frequently compare on biometric readings with biometric reading stored in a central repository. This central repository may become a high-value target for hackers and other malicious entities who may attempt to access the central repository of biometric information to gain access to thousands, millions, or even billions of accounts. Some embodiments may address this concern by storing only known users of a device in a localized repository and may further increase security by making this information self-deleting or self-encrypting. Reduction of the amount of biometric information stored in computer memory may make the respective computer memory easier to defend and reduces the risks of large-scale data breaches that put millions or even billions of economic transactions in danger.

Example Flowcharts

Figure 2:
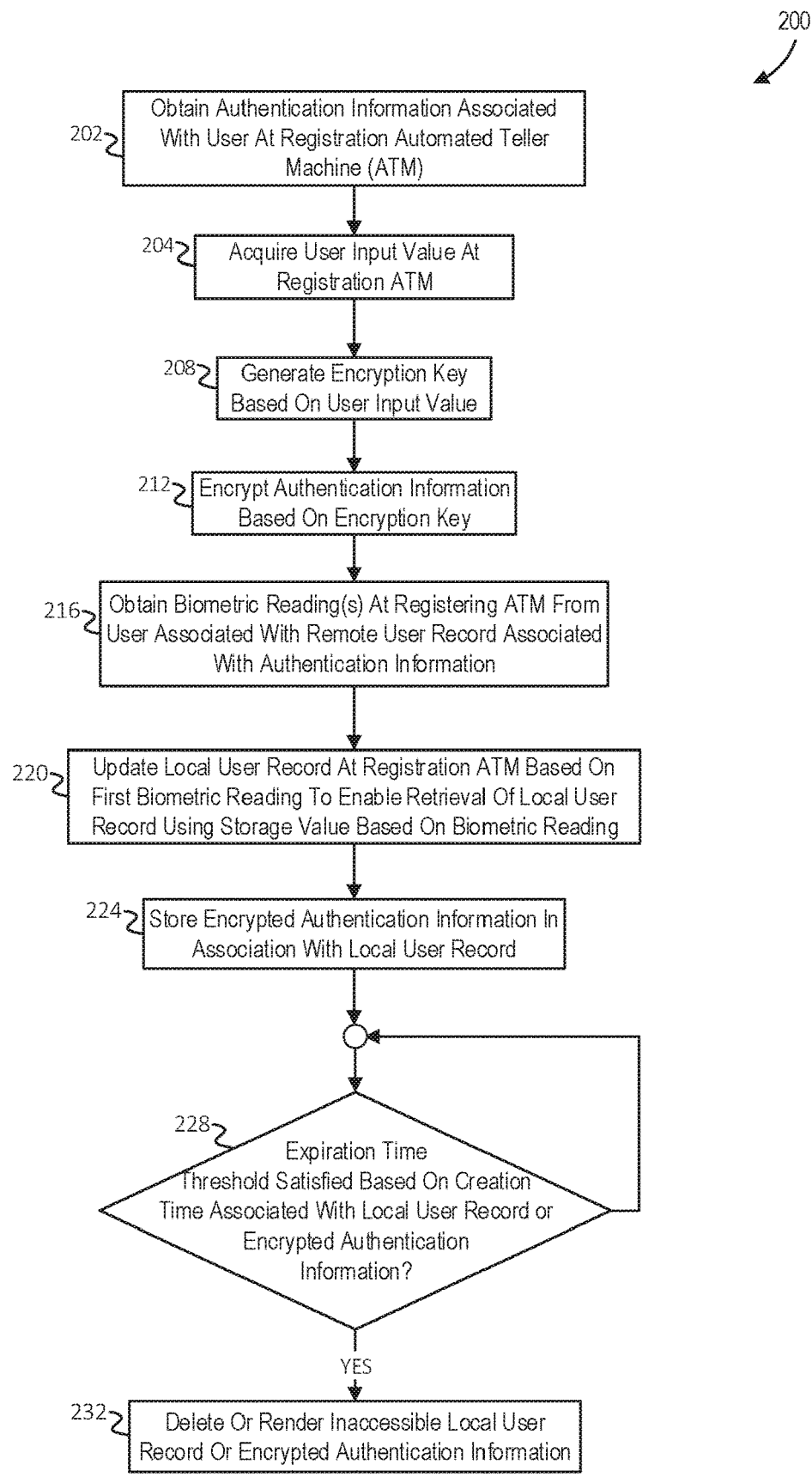
FIG. 2 is a flowchart of operations to store authentication information in association with a local user record based on a biometric reading, in accordance with one or more embodiments.
Figure 3:
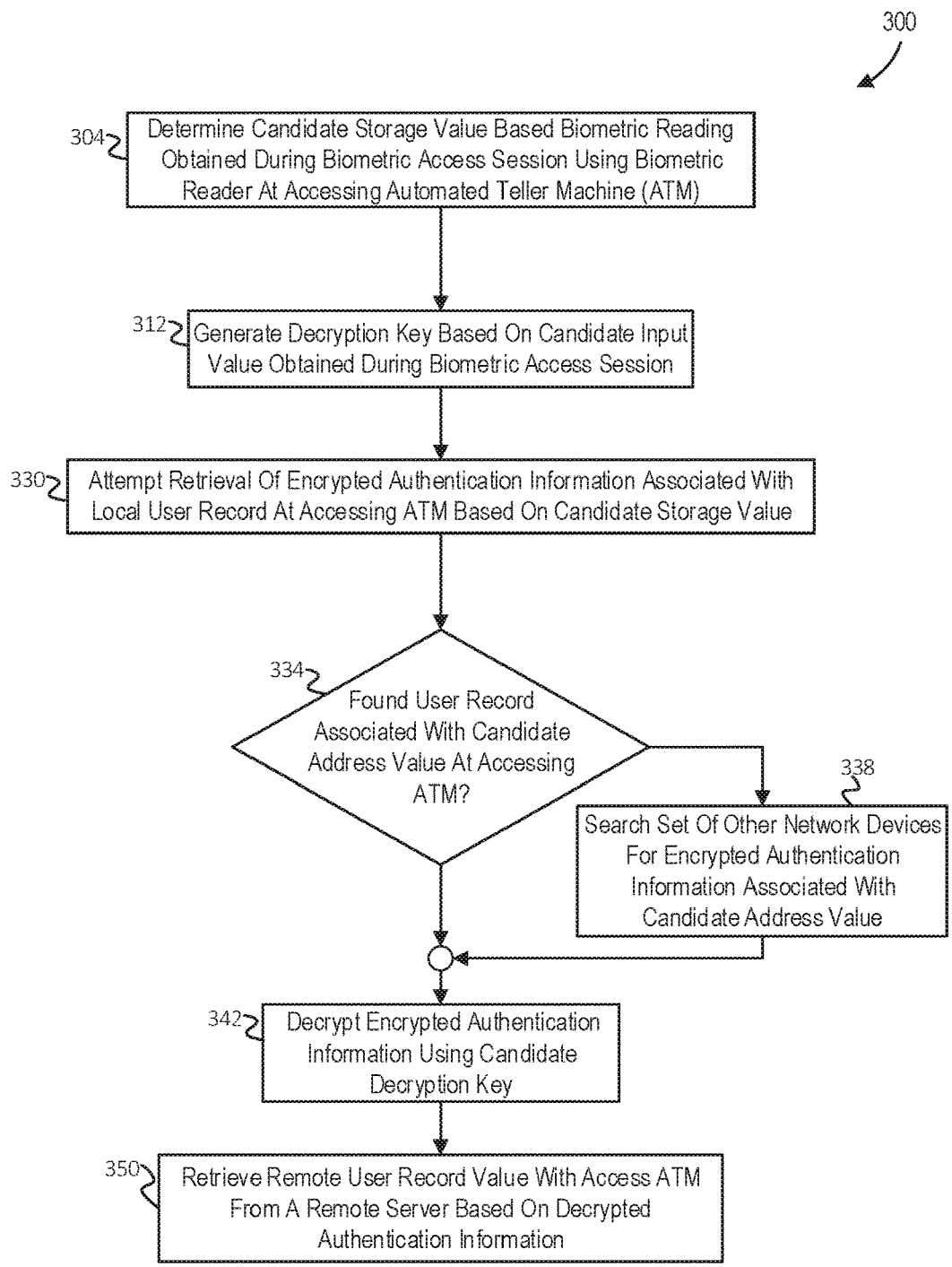
FIG. 3 is a flowchart for retrieving a value from a remote user record based on a biometric reading, in accordance with one or more embodiments.

FIG. 2 and FIG. 3 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. For example, with respect to the method 200, some embodiments may perform operations of the method 200 without an expiration time threshold and without performing the operation 228. Additionally, the order in which the processing operations of the methods are illustrated (and described below) is not intended to be limiting. For example, with reference to FIG. 2 below, storing authentication information as described below for the operation 224 may occur before the obtaining a biometric reading as described for the operation 216.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 2 is a flowchart of operations to store authentication information in association with a local user record based on a biometric reading. Operations of the method 200 may begin at operation 202. In the operation 202, authentication information associated with a user may be obtained during a registration session at a registration ATM. A registration session may include an access session during which a user stores biometric information used to generate a storage value on a registration ATM or a data storage in communication with the registration ATM via a local area network. The storage value may be used to determine where to store authentication information associated with a user or user record, as further described below. A registration ATM may be any ATM that is used by a user during the registration session and may be the same as or different from an accessing ATM, as further described below. Alternatively, some embodiments may include generating or determining the storage value based on input values other than a biometric information, where the biometric information may be used instead to verify that access to data associated with the storage value should be provided.

In some embodiments, the authentication information may be obtained from a card, RFID device, mobile computing device, and the like. For example, the authentication information may be obtained from a card inserted into a card slot of a registration ATM. The authentication information may include various numbers, strings, images, or other data types holding information associated with the user. The authentication information may include a bank account number, a credit card number, a verification code, or the like. In some embodiments, the authentication information may be obtained by providing the registration ATM with identification value from a mobile computing device, wherein the identification value may include the authentication information.

In some embodiments, different sets of authentication information may be provided for a same user. For example, a user may present a first credit card having a first set of authentication information to an accessing ATM, and the user may then present a second credit card having a second set of authentication information to the accessing ATM. As discussed further below, both sets of authentication information may be associated with the same user and may be stored in association with a same user record to enable biometric access to remote user record values and other values made accessible by their respective associated authentication information.

In the operation 204, a user input value is acquired at the registration ATM. The user input value may be acquired from a user using the touchpad, keyboard, set of buttons, touchscreen, voice recognition system, or other data entry interface. For example, the user input value may be acquired from a numeric keypad. In some embodiments, a plurality of user input values are required. For example, a user may input a first user input value such as a PIN and a second user value from a mobile computing device. In some embodiments, the user input value may be a biometric reading, where the biometric reading may be distinct from the biometric reading described below for the operation 216. Furthermore, in some embodiments, a first user input value that is associated with a first set of authentication information may be acquired and a second user input value that is associated with a second set of authentication information may be acquired. For example, a first PIN number for a first set of authentication information corresponding to a personal account card associated with a user may be acquired, and a second PIN number for a second set of authentication information corresponding to a business account card associated with the same user may be acquired during the same or a subsequent registration session.

In an operation 208, an encryption key may be generated based on the user input value. In some embodiments, the encryption key may be based on the user input value by being equal to the user input value. For example, a user may provide the PIN "5533" or say "5533" into a microphone attached to a registration ATM to provide the user input value "5533," and the encryption key may be set to be to equal to "5533." Alternatively, or in addition, the encryption key may be calculated from the user input value. For example, the user input value may be a fingerprint from the user's left index finger obtained by the registration ATM using a capacitive fingerprint scanner, and the relative positions between minutiae of the fingerprints (e.g. ridge line bifurcations and ridge line endings) may be used to calculate a set of array values which may then be used as the encryption key. In some embodiments, the encryption key may itself be a cryptographic hash based on the user input value. Examples of cryptographic hashing algorithms may include a result from applying a cryptographic hashing algorithm such as MD-5, SHA-2, Bcrypt, Scrypt, or the like. For example, the encryption key may be equal to a cryptographic hash that begins with the characters "$2y$04$" after applying a 4-round Bcrypt algorithm to the PIN "5533." In some embodiments, cryptographically hashing operations may further include salting operations or peppering operations. In some embodiments, a first user input value may be used to generate a first encryption key and a second user input value may be used to generate a second encryption key. For example, a first and second PIN number may be provided to the accessing ATM to determine a first and second encryption key, where both the first and second encryption key may be used to decrypt different sets of encrypted authentication information that are associated with a same user.

In an operation 212, authentication information may be encrypted based on the encryption key. Various encryption methods may be used to encrypt the authentication information into an encrypted form ("encrypted authentication information"). Authentication information associated with a user may be encrypted such that an encryption key generated based on a user input value provided by the user may be used to decrypt the encrypted authentication information. Encryption methods may include symmetric encryption methods or asymmetric encryption methods. Example encryption methods may include use of a data encryption standard (DES) algorithm, a triple DES algorithm, an RSA algorithm, an advanced encryption standard (AES) algorithm, a Twofish algorithm, and the like. In some embodiments, authentication information may be encrypted by itself. Alternatively, or in addition, the authentication information may be encrypted in combination with other values such as values of a user record storing the authentication information or values otherwise associated with the authentication information. For example, the authentication information may be stored as part of a user record, and the authentication information may be encrypted by encrypting the entire user record.

In some embodiments, a cryptographic hash of the authentication information ("hashed authentication information") may be generated. For example, a cryptographic hash of the authentication information may be generated via an MD-5 algorithm. As discussed further below, the hashed authentication information may be used to compare with a later-generated cryptographic hash of decrypted authentication information ("hashed decrypted information") to verify if the candidate authentication information determined during a later access session matches the authentication information stored during the registration session.

In an operation 216, a biometric reading may be obtained at the registering ATM from the user associated with a remote user record associated with the authentication information. In some embodiments, a biometric reading may be obtained by a registration ATM during an access session between a user and the registration ATM, where the user may be prompted with a question about whether they wish to access data associated with their user record using a biometric reading. For example, before or after performing a transaction, a screen attached to a registration ATM may display the text "would you like to register your account to enable you to access your account using your fingerprint?" After confirmation by the user that they wish to access their records using a biometric reading (e.g. by pushing a "yes" button on a touchpad, pressing a virtual button having the text "I wish to register" on a touchscreen, etc.), the registration ATM may display visual or audio instructions on use of a biometric sensor attached to the registration ATM to enable the registration ATM to obtain the biometric reading.

In some embodiments, the biometric reading may be obtained using a biometric scanner, where the biometric reading may include various types of biometric values. Example biometric readings may include a fingerprint, hand print, facial scan, iris scan, full body scan, partial body scan, and the like. For example, some embodiments may obtain a biometric reading by acquiring a set of images of a fingerprint associated with an index finger of the user. In some embodiments, a user may provide the biometric readings directly. Alternatively, or in addition, a user may provide the biometric reading via an electronic device such as a mobile phone. For example, a registration ATM may obtain a biometric reading from a user via a cell phone in communication with the registration ATM. In some embodiments, obtaining a biometric reading may include using the registration ATM to obtain multiple types of biometric readings (e.g. by using a multimodal biometric device, using different types of biometric devices, etc.). For example, some embodiments may obtain a first fingerprint from a user's left index finger, a second fingerprint from a user's right thumb, and a facial geometry based on face scan.

In an operation 220, a local user record may be updated to enable retrieval of the local user record using a storage value based on the biometric reading. The biometric reading may be used to determine a storage value, where the local user record may be updated based on the storage value. A user record may include any number of values associated with a user or references to values associated with the user. For example, the user record may include only the encrypted authentication information associated with a user. Alternatively, the user record may include a pointer to a record containing the encrypted authentication information associated with the user, a cryptographic hash based on a user input provided by the user, an image of the user, and the like.

In some embodiments, the biometric reading may be a visual scan that is analyzed to generate a vector or matrix based on a geometry determined by detected physical features of the scanned body part (e.g. facial features, minutiae of a fingerprint, finger vein patterns, palm vein patterns, chromophore patterns of an iris, etc.), where a storage value may include or be otherwise based on the vector or matrix. For example, the biometric reading may be fingerprint that is used to compute the vector "[12 34 56 78]" representing distances between bifurcated ridge lines of the fingerprint, where the storage value may then include or otherwise be based on the vector of distances. Similarly, a storage value may be used as, included in, or otherwise based on other vectors, multidimensional arrays, or other sets of values determined from biometric readings such as auditory recordings, bioelectric measurements, and the like. Some embodiments may determine a storage value based on a plurality of biometric readings, such as biometric readings from a multimodal biometric scan. For example, the storage value may be a sum of biometric reading values, a concatenation of biometric reading values, or some other combination of biometric reading values.

In some embodiments, updating a local user record may include creating the local user record at a data storage address or a database index that is referenceable by the storage value via an associative array in a data storage of the registration ATM. For example, after receiving authentication information associated with a user, a user input value provided by the user, and a biometric reading provided by the user, some embodiments may update the local user record by creating a new user record in a first database stored in the data storage of the registration ATM. The new user record may include or otherwise be associated with the authentication information (which may be encrypted) and an encryption value based on the user input value, where an index value of the user record may be retrievable based on a storage value that is based on the biometric reading. Alternatively, or in addition, some embodiments may update the local user record at the data storage of an ATM (or other network device) that is different from the registration ATM.

In some embodiments, the storage value may be generated or otherwise determined independently of the biometric reading. For example, the storage value may be generated and or otherwise retrieved based on an access object such as a card or a user input value provided to a registration ATM (or other network device). The biometric reading may be used to secure the local user record or data stored in the local user record. For example, the local user record may be encrypted or rendered inaccessible based on a biometric reading from a user, and, as further discussed below, a second biometric reading from the same user may be used to unencrypt or render accessible the local user record.

Updating the local user record based on a biometric reading may include updating a value associated with the local user record based on the storage value. For example, updating the local user record may include updating an associative array to an index value associated with the local user record. In some embodiments, a local user record associated with a user may already be stored in a data storage of a registration ATM with an index value of "001." After receiving a biometric reading equal to "1234" from the user, some embodiments may modify an associative array of storage values to user record index values such that the storage value "1234" is associated with the index value "001." In addition, in the case where authentication information may be stored on different ATMs in a local kiosk cluster of ATMs, updating an associative array may include updating the associative array to associate the storage value with both an index value of a database and a data storage in which the database is stored. For example, in some embodiments, updating the local user record based on the biometric reading may include associating a storage value such as "1234" with an index value "001" corresponding to a user record and an indicator that indicates that the database storing the user record is stored in the first ATM 110. In some embodiments, the associative array may be a DHT, and updating the associative array may include updating the DHT and distributing the DHT to other peer nodes in a decentralized system. For example, a DHT that includes associations of storage values with index values in a database may update the DHT at the first ATM 110 and distribute the DHT to the second ATM 120.

In an operation 224, the encrypted authentication information may be stored in association with the local user record. Storing the encrypted authentication information in association with the local user record allows retrieval of the encrypted authentication information by a user having access to a corresponding local user record. Thus, encrypted authentication information may be retrieved based on a biometric reading if the associated local user record is accessible based on the biometric reading. In some embodiments, the encrypted authentication information may be stored into the local user record directly. Alternatively, or in addition, the encrypted authentication information may be associated with the local user record by storing a pointer to the encrypted authentication information in the local user record.

In some embodiments, if different sets of authentication information associated with a same user are provided, either during a same registration session or during different registration sessions, a first label and second label may be determined for each respective set of authentication information. For example, a first amount of authentication information may be encrypted and stored in a user record. Some embodiments may then determine a first label associated with the first set of encrypted authentication information, and the user record may include the first label. In a later time of the same registration session or during a later registration session, a second amount of encrypted authentication information may be stored in the same user record, and some embodiments may determine a second label associated with the second set of encrypted authentication information. The user record may then include the second label. As further discussed below, in some embodiments, the first and second labels may be used to help distinguish what values from a set of authentication information are to be used to retrieve a remote user record value.

In an operation 228, a determination of whether an expiration time threshold is satisfied may be effectuated based on a creation time associated with the local user record or the encrypted authentication information. In some embodiments, an expiration time threshold may be set by default. For example, the expiration time threshold may be equal to 24 hours, 72 hours, 7 days, 14 days, and the like. Alternatively, or in addition, the expiration time may be determined based on a user-selected time value and setting the expiration time to be equal to or be otherwise based on the expiration time. For example, during the registration session, the user may be asked how long they wish the registration to last via an ATM display and be presented with a set of time durations. The user may use a touchpad, keypad, or some other method of selecting a time value. The expiration time threshold may then be compared to a time difference between a current time and a creation time associated with the local user record or the authentication information, where the expiration time threshold may be satisfied if the time difference is equal to or greater than the expiration time threshold. For example, if the expiration time threshold is 24 hours and the time difference between a current time and a creation time for a local user record is 24 hours or greater, a determination may be made that the expiration time threshold is satisfied. If a determination may be made that the expiration time threshold is satisfied, operations of the method 200 may proceed to the operation 232. Otherwise, operations of the method 200 may return to the operation 228 to wait until the expiration time threshold is satisfied.

In an operation 232, the local user record or the encrypted information may be deleted or otherwise rendered inaccessible. In some embodiments, in response to a determination that the expiration time threshold is satisfied, the local user record or authentication information associated with the local user record may be deleted. In some embodiments, the local user record may be completely deleted. Alternatively, some embodiments may retain elements of the local user record to increase registration speed or for record-keeping purposes. For example, in some embodiments, the index value of a local user record associated with a user may be retained while the authentication information associated with the user, a name associated with the user, and other information associated with the user is deleted. Alternatively, or in addition, some embodiments may render the authentication information inaccessible by cryptographically hashing the authentication information.

FIG. 3 is a flowchart of a method for retrieving a value from a remote user record based on a biometric reading. Operations of the method 300 may begin at operation 304. In an operation 304, a candidate storage value may be determined based on a biometric reading obtained during a biometric access session using a biometric sensor at an accessing ATM. A biometric access session for an accessing ATM may be any access session between a user and the accessing ATM, where a user record associated with the user is accessed by a biometric reading obtained by the accessing ATM. An accessing ATM may be any ATM used to access values associated with a user record. In some embodiments, the biometric reading may be obtained in a manner similar to that described above for the operation 216, where a body part measured to obtain a previous biometric reading during a previous access session such as a registration session may be the same body part measured during a biometric access session.

In some embodiments, the ATM obtaining the biometric reading during the biometric access session may be different from the ATM that updated a local user record based on a previous biometric reading during a previous access session such as a registration session. For example, the first ATM 110 may be used to update a user's user record based on a first biometric reading obtained during a registration session, and the second ATM 120 may be used to access the user's authentication information based on a second biometric reading obtained during the biometric access session. Alternatively, the ATM obtaining the biometric reading during the biometric access session may be the same as the ATM that updated a local user record based on a different biometric reading obtained during a registration session. For example, the first ATM 110 may be used to update a user's user record based on a first biometric reading obtained during a registration session, and the first ATM 110 may also be used to access the user's authentication information based on a second biometric reading obtained during the biometric access session. Furthermore, in some embodiments, a user may be prompted to select an account record to access based on a set of labels, such as those described for the operation 224.

In some embodiments, the candidate storage value determined during the operation 304 may be obtained using the method described above for the operation 220. For example, if the storage value described for the operation 220 is determined by applying a distance-measuring operation between detected features of a facial geometry obtained during a registration session, the candidate storage value may be obtained by applying the same distance-measuring operation to a second biometric reading obtained during the second biometric session. As discussed further below, the candidate storage value may be a duplicate value of the storage value described above for the operation 220.

In an operation 312, a candidate decryption key may be generated based on a candidate input value obtained during the biometric access session. In some embodiments, the candidate input value may be obtained using a method similar to or identical to the methods described for the operation 204. For example, if a first fingerprint from a left index finger was obtained during a registration session at the first ATM 110, a second fingerprint from the same left index finger may be obtained during a biometric access session. In some embodiments, the candidate decryption key may be generated using a method similar to or identical to the operation 208, and the candidate decryption key may be a duplicate of the encryption key described in the operation 208.

In an operation 330, retrieval of encrypted authentication information associated with a local user record based on the candidate storage value may be attempted at the accessing ATM. In some embodiments, retrieval of the encrypted authentication information may include operations to refer to an associative array stored in the accessing ATM to retrieve the encrypted authentication record. For example, if the candidate storage value is "12345678" and the accessing ATM includes an associative array that associates the candidate storage value "12345678" with the index value "001" in a user record database, the ATM may retrieve encrypted authentication information from the user record having an index value "001" in the user record database.

In some embodiments, the associative array may indicate both an index value of a record in a database as well as a data storage in which the database is stored. For example, after receiving the candidate storage value '12345678' based on a candidate input value provided by a user at the second ATM 120, some embodiments may refer to an associative array that associates the candidate storage value '12345678' to the array "[001, db1, ATM110]," where the array [001, db1, ATM110] may indicate that the encrypted authentication information may be stored in a record having an index value of 001 in a database db1 that is stored in the first ATM 110.

In an operation 334, a determination of whether a user record associated with candidate storage values is found in the accessing ATM may be effectuated. In some embodiments, a determination may be made that a user record associated with a candidate storage value is not found in the accessing ATM if no value equal to the candidate storage value is found in an associative array or a database stored in the data storage of the accessing ATM. If the user record is not found in the accessing ATM, operations of the method 300 may proceed to operation 338. Otherwise, operations of the method 300 may proceed to operation 342.

In an operation 338, the cluster of network devices may be searched to find the user record or authentication information associated with the candidate storage value determined from the biometric value obtained at the accessing ATM. In some embodiments, the accessing ATM may directly send a query to one or more other network devices in communication with the accessing ATM. For example, if the accessing ATM is the first ATM 110, the first ATM 110 may send a query that includes the candidate storage value to the second ATM 120, and the second ATM 120 may send a response to the first ATM 110 that includes the encrypted authentication information.

In an operation 342, the encrypted authentication information may be decrypted using the candidate decryption key. The decryption method used may be a decryption function that complements the encryption used above for the operation 212. For example, in some embodiments, if an encryption operation uses the steps of an AES algorithm to encrypt the authentication information during a registration session, some embodiments may perform the reverse steps of the same AES algorithm to decrypt the encrypted authentication information. In some embodiments, a determination may be made that the decrypted authentication information is successfully decrypted by comparing a hash of the decrypted authentication to a verification hash of the authentication information, as discussed above for the operation 212. For example, a decryption operation of the encrypted authentication information results in decrypted authentication information that includes the array "[0011, 0022, 999]," which may represent a bank account number, a credit card number, and a verification code, respectively. The array may then be concatenated and used to generate hashed decrypted information. If the hashed decrypted information matches with the hashed encrypted information described above for the operation 212, a determination may be made that the decryption is successful.

In an operation 350, a remote user record value may be retrieved by the access ATM based on the authentication information. Once decrypted, the authentication information may be included in a message sent to a remote server to access a remote user record. Alternatively, some embodiments may transmit the encrypted authentication information in a first message to the remote server to reduce hacking risk, such as a man-in-the-middle attack, and transmit a second message to the remote server, where the second message may include the decryption key or a value based on the decryption key. Once the message is received by an API of the remote server 140, the first ATM 110 may retrieve a remote user record identified by the authentication or values associated with the remote user record. For example, if the first ATM 110 is the access ATM, the first ATM 110 may send a message to the remote server 140 to retrieve a value from the remote data storage 144 based on the decrypted authentication information.

In some embodiments, the message may include an authentication request, where an authentication request directs a request recipient to verify that the authentication information associated with the authentication information satisfies one or more authentication criteria. The remote server may transmit a response to the authentication request, where the response may include a confirmation message indicating that the authentication information satisfied an authentication criterion. The authentication criterion may include a determination that the authentication information matches with corresponding authentication information stored on the remote server. For example, the remote server 140 may transmit a confirmation message to the first ATM 110 indicating that the authentication information matches with the corresponding authentication information associated with a user record stored in the remote server 140.

In some embodiments, the remote server may transmit a response including a message indicating that the authentication message does not match a stored authentication value or otherwise does not satisfy an authentication criterion. For example, the authentication information sent to the remote server may include an expiration date that is already expired or may include an account number that is different from the account number stored in the remote server. In response, the remote server 140 may transmit a message to the first ATM 110 that the decrypted authentication message does not match authentication information stored in the remote server 140.

In some embodiments, the various computers and subsystems illustrated in FIG. 1 may include one or more computing devices that are programmed to perform the functions described herein. The computing devices may include one or more electronic storages (e.g., first ATM data storage 114, second ATM data storage 124, a local server storage 136, remote data storage 144, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or client devices; or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method comprising: obtaining, via a first kiosk, a first biometric reading associated with a user during a first session; updating a local user record based on the first biometric reading, wherein the local user record is associated with encrypted information, and wherein the local user record is retrievable based on the first biometric reading, and wherein the encrypted information comprises encrypted authentication information; obtaining a second biometric reading and a user input value during a second session; retrieving the encrypted information based on the second biometric reading; generating a decryption key based on the user input value; and decrypting the encrypted information based on the decryption key generated from the user input value to determine authentication information associated with the user.

2. The method of embodiment 1, wherein retrieving the encrypted information comprises retrieving the local user record.

3. The method of embodiment 2, wherein the first biometric reading corresponds to a first portion of a body, and wherein the method further comprise obtaining a third biometric reading, wherein the third biometric reading corresponds to a second portion the body, and wherein retrieving the local user record comprises retrieving the local user record based on the third biometric reading.

4. The method of any of embodiments 2 to 3, wherein retrieving the local user record comprises retrieving encrypted authentication information associated with the local user record based on the second biometric reading.

5. The method of any of embodiments 2 to 4, wherein retrieving the local user record comprises retrieving the local user record based on the user input value.

6. The method of any of embodiments 1 to 5, wherein retrieving the encrypted information comprises retrieving the encrypted information without accessing the Internet.

7. The method of any of embodiments 1 to 6, further comprising storing the encrypted information at the first kiosk in association with the local user record.

8. The method of any of embodiments 1 to 7, wherein the user input value comprises a third biometric reading, and wherein the method further comprises: obtaining the first biometric reading comprises measuring a first portion of a body; and obtaining the third biometric reading comprises measuring a second portion of the body.

9. The method of any of embodiments 1 to 8, further comprising retrieving a remote user record value from a remote server based on the authentication information.

10. The method of any of embodiments 1 to 9, wherein the local user record is stored at the first kiosk.

11. The method of any of embodiments 1 to 10, wherein: updating the local user record comprises updating, without accessing the Internet, the local user record in a data storage medium of a computing device; obtaining the second biometric reading comprises obtaining, via a second kiosk, the second biometric reading, wherein the second kiosk is in communication with the computing device and the first kiosk via a local area network; and sending a message to the computing device from the second kiosk, wherein the message is based on the second biometric reading.

12. The method of any of embodiments 1 to 11, further comprising: sending, without accessing the Internet, a first message based on the second biometric reading from a second kiosk to the first kiosk, wherein the second kiosk is in communication with the first kiosk via a local area network; and receiving a second message based on the local user record at the second kiosk from the first kiosk.

13. The method of any of embodiments 1 to 12, wherein obtaining the first biometric reading comprises measuring a record of a portion of a body, and wherein the portion of the body comprises a finger, hand, eye, or face.

14. The method of any of embodiments 1 to 13, wherein obtaining the first biometric reading comprises collecting an auditory recording associated with the user.

15. The method of any of embodiments 1 to 14, further comprising: sending an authentication request to a remote server based on the authentication information; and receiving a confirmation message from the remote server indicating that the authentication information satisfied an authentication criterion.

16. The method of any of embodiments 1 to 15, further comprising: determining whether an expiration time threshold is satisfied based on a creation time associated with the local user record or the encrypted information; and deleting the local user record or the encrypted information in response to a determination that the expiration time threshold is satisfied.

17. The method of any of embodiments 1 to 16, further comprising: receiving a user-selected time value; and setting an expiration time threshold based on the user-selected time value.

18. The method of any of embodiments 1 to 17, further comprising: obtaining, via the first kiosk, an identification value during the first session; and determining the authentication information based on the identification value.

19. The method of any of embodiments 1 to 18, further comprising obtaining the authentication information from a mobile computing device.

20. The method of any of embodiments 1 to 19, further comprising: obtaining a previous biometric reading during a previous access session, wherein the previous access session occurs before the first session or during the first session; retrieving candidate authentication information during the previous access session based on the previous biometric reading; and receiving a message from a remote server indicating that the candidate authentication information does not match the authentication information.

21. The method of any of embodiments 1 to 20, wherein the user input value is a second user input value, and wherein the method further comprises: obtaining, via the first kiosk, a first user input value; generating an encryption key based on the first user input value; and encrypting the authentication information based on the encryption key to determine the encrypted information.

22. The method of any of embodiments 1 to 21, further comprising: wherein the authentication information is associated with a user record stored in a remote server.

23. The method of any of embodiments 1 to 22, wherein the authentication information is a first amount of authentication information, and wherein the encrypted information is a first amount of encrypted information, and wherein a first label is associated with the first amount of encrypted information, and wherein the method further comprising: obtaining a second user input value; generating a second encryption key based on the second user input value; encrypting a second amount of authentication information to determine a second amount of encrypted information based on the second encryption key; determining a second label based on the second amount of authentication information, wherein the second label is different from the first label; and storing the second amount of encrypted information and the second label at the first kiosk in association with the local user record, wherein the second label is associated with the second amount of encrypted information.

24. The method of any of embodiments 1 to 23, wherein a local kiosk cluster comprises the first kiosk and the second kiosk, and wherein the first kiosk and the second kiosk are in communication via a local area network.

25. The method of any of embodiments 1 to 24, further comprising determining whether the local user record is stored in a local memory data storage of the second kiosk; in response to a determination that the local user record is not stored in the data storage of the second kiosk, send a query based on the second biometric reading to the first kiosk; and retrieving the encrypted authentication information based on the query, wherein the encrypted authentication information is retrieved via a local area network without accessing the Internet.

26. The method of any of embodiments 1 to 25, wherein: the user input value is not stored in the local user record; and the first biometric reading is not transmitted over the Internet.

27. A non-transitory, computer-readable media storing instructions that, when executed by one or more processors, effectuate operations comprising the methods of any of embodiments 1 to 26.

27. A system for providing biometric identity confirmation via local kiosk clusters, the kiosks are automated teller machines (ATMs), and wherein the ATMs are configured to effectuate operations comprising the methods of any of embodiments 1 to 26.

What is claimed is:

1. A system for providing biometric identity confirmation via local kiosk cluster, the system comprising:
    a first automated teller machine (ATM) of the local kiosk cluster and a second ATM of the local kiosk cluster, wherein the first ATM and the second ATM are in communication via a local area network;
    wherein the first ATM is configured to:
    obtain a user input value during a registration session;
    generate an encryption key based on the user input value;
    encrypt authentication information to generate encrypted authentication information based on the encryption key generated from the user input value, wherein the authentication information is associated with a remote record stored in a remote server;
    obtain a first biometric reading from a user associated with the remote record;
    update a local user record at the first ATM based on the first biometric reading, wherein the local user record is retrievable based on the first biometric reading;
    store the encrypted authentication information at the first ATM in association with the local user record;
    wherein the second ATM is configured to:
    subsequent the registration session, obtain a second biometric reading and a duplicate value during a biometric access session with the second ATM, wherein the duplicate value is equal to the user input value;
    retrieve the encrypted authentication information associated with the local user record based on the second biometric reading by:
    determining whether the local user record is stored in a data storage of the second ATM;
    in response to a determination that the local user record is not stored in the data storage of the second ATM, send a query to the first ATM based on the second biometric reading; and
    retrieving the encrypted authentication information from the first ATM based on the query, wherein the encrypted authentication information is retrieved via the local area network without accessing the Internet;
    generate a decryption key based on the duplicate value; and
    decrypt the encrypted authentication information to retrieve the authentication information based on the decryption key generated from the duplicate value.

2. The system of claim 1, wherein:
    the user input value is not stored in the local user record; and
    the first biometric reading is not transmitted over the Internet.

3. A method comprising:
    obtaining, by a first kiosk, a first biometric reading of a user and a user input value during an access session;
    sending, by the first kiosk, without accessing the Internet, a first message to a second kiosk via a local area network, wherein the first message comprises biometric data corresponding to the first biometric reading;
    retrieving, by the first kiosk, without accessing the Internet, a second message from the second kiosk based on the sending of the first message, wherein the second message comprises encrypted authentication information associated with a local user record, wherein the local user record (i) was previously created or updated by the second kiosk based on a prior biometric reading obtained via the second kiosk during a registration session and (ii) retrievable by the second kiosk using biometric data corresponding to the prior biometric reading;
    generating a decryption key based on the user input value;
    decrypting the encrypted authentication information associated with the local user record based on the decryption key generated from the user input value to determine authentication information associated with the user; and
    retrieving a remote user record value from a remote server based on the authentication information.

4. The method of claim 3, wherein:
    a version of the local user record in a data storage of a computing device is updated based on the prior biometric reading without accessing the Internet; and
    the first kiosk is in communication with the computing device via the local area network.

5. The method of claim 3, wherein obtaining the first biometric reading comprises measuring a record of a portion of a body, and wherein the portion of the body comprises a finger, hand, eye, or face.

6. The method of claim 3, wherein obtaining the first biometric reading comprises collecting an auditory recording associated with the user.

7. The method of claim 3, wherein:
    the user input value comprises a second biometric reading;
    obtaining the first biometric reading comprises measuring a first portion of a body; and obtaining the second biometric reading comprises measuring a second portion of the body.

8. The method of claim 3, wherein the user input value is a first user input value, and wherein:
a prior user input value is obtained via the second kiosk;
an encryption key is generated based on the prior user input value;
the authentication information is encrypted based on the encryption key; and
the encrypted authentication information is stored at the second kiosk in association with the local user record.

9. The method of claim 3, further comprising:
sending an authentication request to the remote server based on the encrypted authentication information; and
receiving a confirmation message from the remote server indicating that an authentication criterion is satisfied based on the sending of the authentication request.

10. The method of claim 3, further comprising:
determining whether an expiration time threshold is satisfied based on a creation time associated with the encrypted authentication information; and
deleting the encrypted authentication information in response to a determination that the expiration time threshold is satisfied.

11. The method of claim 10, further comprising:
receiving a user-selected time value; and
setting the expiration time threshold based on the user-selected time value.

12. The method of claim 3, wherein the user input value is an identification number.

13. The method of claim 3, further comprising:
obtaining a previous biometric reading during a previous access session, wherein the previous access session occurs before the registration session or during the registration session;
retrieving candidate authentication information during the previous access session based on the previous biometric reading; and
receiving a message from the remote server indicating that the candidate authentication information does not satisfy an authentication criterion.

14. A non-transitory, computer-readable media storing instructions that, when executed by one or more processors, effectuate operations comprising:
obtaining, via a first kiosk, a user input value during a registration session;
generating a first encryption key based on the user input value;
encrypting first authentication information to generate first encrypted information based on the first encryption key generated from the user input value, wherein the first authentication information is associated with a user record stored in a remote server;
obtaining, via the first kiosk, a first biometric reading from a user during the registration session;
updating a local user record at the first kiosk based on the first biometric reading, wherein the local user record is retrievable based on the first biometric reading;
storing the first encrypted information at the first kiosk in association with the local user record;
obtaining a second biometric reading and the user input value during a second session;
retrieving, without accessing the Internet, the local user record based on the second biometric reading;
generating a decryption key based on the user input value;
decrypting the first encrypted information based on the decryption key generated from the user input value;
obtaining a second user input value;
generating a second encryption key based on the second user input value;
encrypting second authentication information to determine second encrypted information based on the second encryption key; and
storing the second encrypted information at the first kiosk in association with the local user record.

15. The media of claim 14, wherein retrieving the local user record comprises retrieving the local user record based on the user input value.

16. The media of claim 14, wherein the first biometric reading corresponds to a first portion of a body, and wherein the operations further comprise obtaining a third biometric reading, wherein the third biometric reading corresponds to a second portion the body, and wherein retrieving the local user record comprises retrieving the local user record based on the third biometric reading.

\* \* \* \* \*